Aug. 9, 1966 W. LEWI 3,265,265
MULTI-LOCK CLAMPING CHAIN AND METHOD
Filed March 19, 1964

United States Patent Office 3,265,265
Patented August 9, 1966

3,265,265
MULTI-LOCK CLAMPING CHAIN AND METHOD
William Lewi, 1840 Relyea Drive, Long Island City, N.Y.
Filed Mar. 19, 1964, Ser. No. 353,202
3 Claims. (Cl. 226—2)

This invention relates to opposed locked together moving chain links and more particularly to such links having a thermoplastic film clamped therebetween so that various operations may be accurately performed thereon without a stress and strain distortion of said clamped film.

As shown and described in Patent U.S. 2,896,943 a continuous thermoplastic film is clamped between co-acting moving top and bottom U-shaped frames.

Such a clamping action is quite satisfactory for relatively thick films. However, modern films made from Mylar may be as thin as 0.001 inch and to rigidly clamp such thin films between the planar flat surfaces areas of the U-shaped frames and against the action of dies, etc., is very difficult.

Accordingly, it is an object of this invention to increase the clamping or seizure pressure or force on the film disposed between the U-shaped clamps.

It is another object to lockingly seize the film disposed between the U-shaped frames at preselected points along the periphery of the frames.

Figure 1:
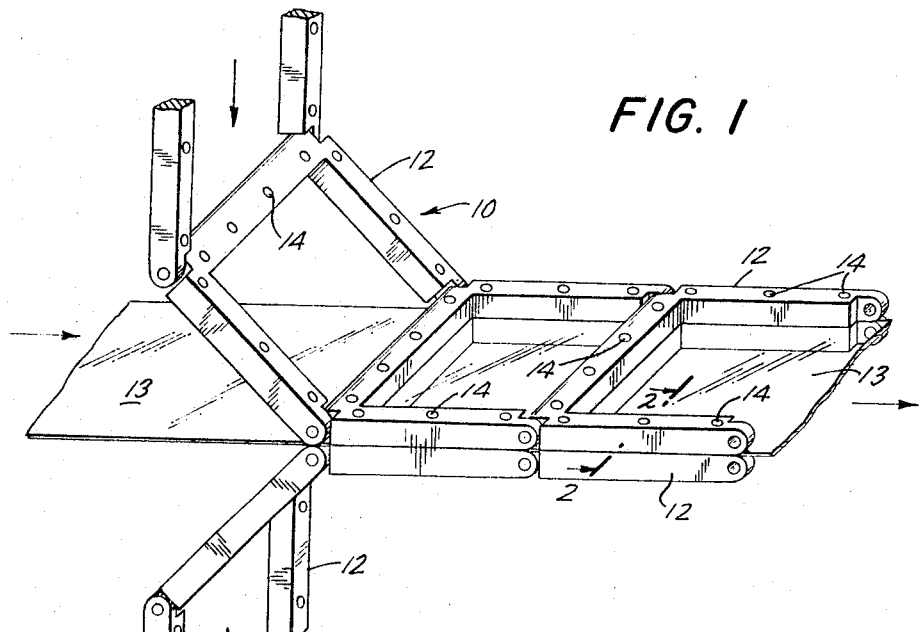
Figure 2:
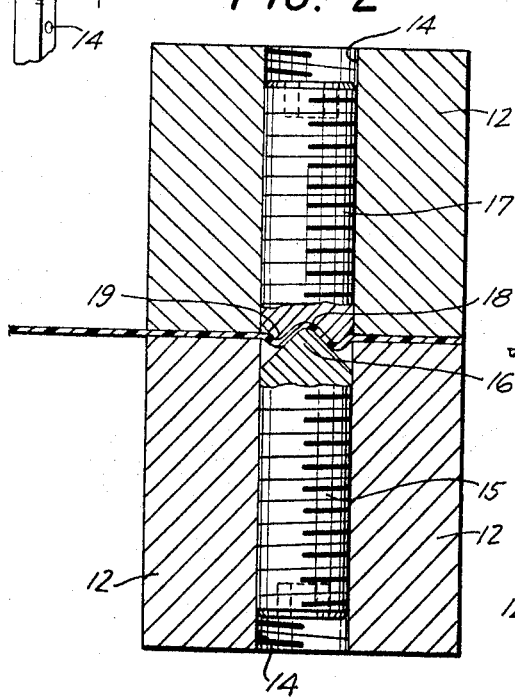
Figure 3:
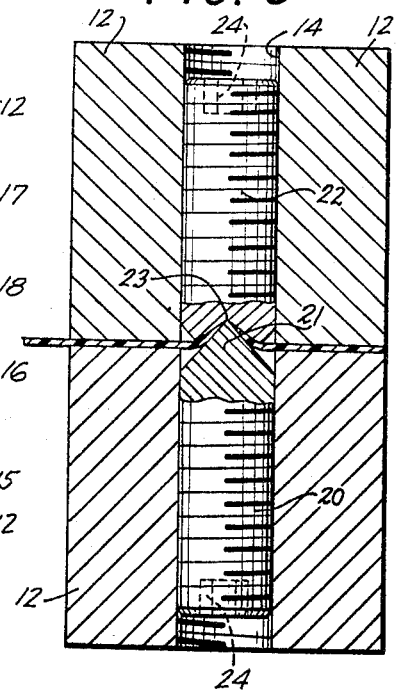

These and other objects of this invention will become apparent upon reading the following descriptive disclosure taken in conjunction with the accompanying drawing in which;

FIG. 1 is a schematic partial view of a co-acting clamping dual chain having U-shaped links, showing the manner of feeding a plastic film therebetween, FIG. 2 is a transverse section view taken along line 2—2 of FIG. 1 and showing a pair of opposed co-acting threaded set screws, broken away in part, disposed in threaded boreholes and the manner of locking the film between said opposed set screws, and FIG. 3 is a view similar to that of FIG. 2 wherein the opposing sets screws are modified so as to perforate the film to effect a perforated modified locking therebetween.

Where thin film of thermoplastic film material or where easily stress distorted thermoplastic film is used, it is important that the film clamped between the U-shaped clamps does not shift upon being subjected to the stress of heated die molding, loading with merchandise, sealing with a cover sheet, etc. as the film passes through these various stations of operation thereon.

The chain is operated in timed intermittent movement and the various operations performed on the film as it comes to rest are of a precision character, so that any shifting of the film is highly undesirable.

To prevent such shifting of the film according to this invention each of the U-shaped clamps are provided with a plurality of identical threaded boreholes identically spaced-apart on the members constituting the U-shaped frames. At least two suitably spaced boreholes are made in each section of the three elements constituting the U-shaped frame.

As shown in FIG. 2, the boreholes of the top clamp are disposed precisely over the boreholes of the bottom clamp so that pairs of co-acting set screws disposed suitably in said clamps meet in a precise predetermined manner to effect a locking seizure on the film between the opposing set screws.

Turning now to the drawing, a top 10 and a bottom 11 chain, each made of mating identical U-shaped frames 12 are provided with a continuous film 13 disposed in clamped relationship therebetween as set forth in U.S. 2,896,943.

According to this invention each of the frames 12 are modified by providing each of the three structural elements of the U-shaped frame with at least two threaded boreholes 14. The boreholes 14 in the top frame 12 are disposesd so as to be aligned with the boreholes 14 of the bottom frames 12. All the frames 12 therefore are of like construction.

As shown in FIG. 2, a mated male and female pair of set screws is disposed in opposing pairs of boreholes 14. The male set screw 15 in the modification of FIG. 2 is provided with a blunt nose 16 and the female set screw 17 is provided with a round or blunt cavity 18 to receive the blunt nose and to pinch the film 13 therebetween without perforating said film.

As shown in FIG. 2, the male and female set screws are preferably each threaded in their respective boreholes so as to each protrude suitably beyond the flat plane of the frame 12. Thus each pinched portion of the film 13 is provided with an annular channel by the rim 19 of the female set screw and also with a central dome portion by set screw elements 16 and 18.

Thus the film 13 is locked together at at least two spaced-apart points on each side of the rectangular portion of the film clamped within a U-shaped frame thereby preventing movement of the film during the hot die forming operation, etc. thereon.

In the set screw modification of FIG. 3, the male set screw 20 is provided with a sharp point 21, and the female set screw 22 is provided with a co-acting sharply pointed recess 23 so as to effect a perforation on the film and thereby lock the pinched film 13 around the metal point 21 to prevent a pulling away therefrom.

In FIG. 3 only the male point 21 is made to protrude beyond the flat surface of the frame 12 so that channeling of the film around the point need not be present. However, such channeling of the film around the point 21 can be had by suitable screw thread adjustment of the female set screw 22.

It is thus seen that because of the threading of both set screws of a mating pair of predetermined channel or non-channel locking or pinching is possible as well as effecting the degree of seizure that is desired upon the lockingly pinched film.

Thus the set screw pairs are changeable in their co-acting operative ends and they are adjustable in their boreholes one to the other to effect a wide range of seizure pressure and also to effect a channeled seizure of greater seizure area where desired. Thus film of various thickness and quality are accommodated in this invention.

The set screws are provided on their adjustment ends with conventional wells 24 to receive conventional Allen wrenches. Other conventional slot means of obtaining threaded adjustment may be employed on the set screws.

It is therefore seen that the planar clamping action of the chains as set forth in the Patent 2,896,943 is improved in this invention by a selective and localized clamping action within the planar clamping area, said localized clamping being of a locking nature and of greater seizure force than in the planar area so as to pinch with distortion the film in the localized area.

The degree of pinching or locking pressure and the kind of distortion is selective in nature and also of a predeterminable quality as to being channel-like or non-channel-like and also as to being perforated or otherwise.

Fundamentally, the method of clamping of this invention comprises large area of normal planar clamping co-acting with a plurality of localized clamping areas having a strong locking function and disposed within said planar clamping areas. This localized locking effect is adjustable both as to degree of clamping or seizure pressure and also as to kind, for example, whether non-perforated or perforated.

This invention has been illustrated by way of many embodiments thereof but it is not limited thereto.

I claim:

1. In an opposed identical mating U-shaped top and bottom pair of hinged continuously moving planar surface clamping frames for effecting a peripheral clamping action about an area of a moving sheet or plastic film clamped therebetween the improvement comprising said mating pairs of frames having a plurality of spaced-apart opposed suitably threaded boreholes transversely therethrough disposed in axial alignment, and threaded co-acting male and female set screws disposed completely in mating relationship in said opposed pairs of boreholes, whereby adjustment of said set screws to pinchingly seize said film therebetween effects localized locking clamping action of greater seizure force to the already clamped surfaces of said frames.

2. The pair of frames of claim 1 wherein the male set screw is provided at its inner end with a blunt conical configuration and the co-acting female set screw is provided with a mating blunt cavity, whereby a non-tearing locking pinching action is effected on the film disposed therebetween.

3. The method of peripherally locking moving clamping areas of a moving film of thin plastic between pairs of opposed moving planar peripheral U-shaped frames comprising peripheral area clamping said moving film to said moving frames to effect large area planar edge rectangular seizure clamping and spot spaced-apart setscrew clamping said film within said planar clamping to effect a plurality of small area clampings of slip proof locking force within said large area of planar seizure clamping.

References Cited by the Examiner

UNITED STATES PATENTS

| | | |
|---|---|---|
| Re. 23,171 | 11/1949 | Borkland. |
| 2,230,189 | 1/1941 | Ferngren. |
| 2,896,943 | 7/1959 | Lewi _____ 226—172 |
| 3,011,295 | 12/1961 | Brugger _____ 53—372 |

M. HENSON WOOD, JR., *Primary Examiner.*

J. N. ERLICH, *Assistant Examiner.*